Patented May 17, 1932

1,859,146

UNITED STATES PATENT OFFICE

KARL KRAUER, OF BASEL, SWITZERLAND, ASSIGNOR TO THE FIRM OF SOCIETY OF CHEMICAL INDUSTRY IN BASLE, OF BASEL, SWITZERLAND

HALOGEN CONTAINING DYESTUFFS OF THE DIBENZANTHRONE SERIES AND PROCESS OF MAKING SAME

No Drawing. Application filed October 8, 1931, Serial No. 567,759, and in Switzerland October 18, 1930.

This invention relates to the manufacture of new dyestuffs of the dibenzanthrone series containing halogen. It comprises the process of making these new dyestuffs as well as the dyestuffs themselves.

According to the invention, the new products, which are of importance as dyestuffs or as intermediate products, are made by the action of formaldehyde in presence of chlorosulfonic acid on such a dibenzanthrone derivative which contains at least one $x$-H group, $x$ being O or NH.

Such derivatives are, for example, the aminodibenzanthrone, the hydroxydibenzanthrone obtainable therefrom by diazotization and replacement of the diazo-group by the OH-group by boiling, the dihydroxydibenzanthrones obtainable by oxydation of the dibenzanthrone, by fusing the dibenzanthrone sulfonic acid with caustic alkalies, or by fusing the several hydroxybenzanthrones with caustic alkalies, etc.

The new dyestuffs, the constitution of which is unknown, very probably contain the dibenzanthrone skeleton

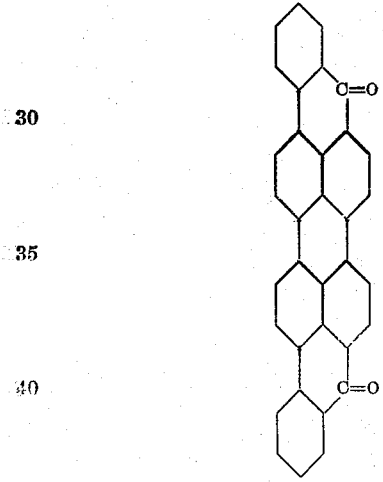

unchanged. They constitute dark powders which dissolve in sulfuric acid to red-violet to blue solutions, yield with an alkaline hydrosulfite solution red-blue to blue vats, and dye cotton according to the nature of the starting material blue, grey or red-brown tints.

The following examples illustrate the invention, the parts being by weight:—

Example 1

50 parts of para-formaldehyde are introduced gradually at 70–80° C. into 270 parts of chlorosulphonic acid; dissolution occurs with evolution of hydrogen chloride. Into this solution, at the same temperature, are introduced 30 parts of dioxydibenzanthrone of the formula

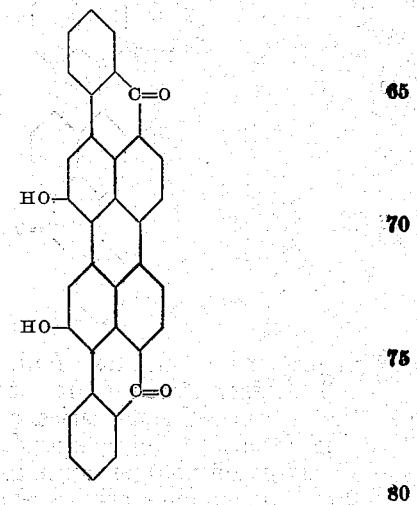

which may be obtained, for example, as described in U. S. Patent No. 1,093,427, and the whole is stirred at 70–80° C. for about 3 hours. After cooling, the solution is poured into ice-water, the violet precipitate is filtered by suction, washed neutral and dried.

The new chlorinated dyestuff is a blue powder, which dissolves in concentrated sulfuric acid to a red-violet solution; it yields a red-blue vat and dyes cotton fast blue tints.

Example 2

Into a solution prepared at 70-80° C. of 50 parts of para-formaldehyde in 270 parts of chlorosulfonic acid there are introduced 20 parts of aminodibenzanthrone, (the position of the amino-group in the product, which, as is known, is obtained by nitrating and reducing dibenzanthrone, is not known). The whole is stirred for 3 hours at the said temperature, then cooled and introduced into ice-water. The brown precipitate is filtered, washed and dried.

The solution of the new halogenated dyestuff in sulfuric acid is blue and when diluted with water yields red-brown flocks. The dye yields a blue vat and dyes cotton red-brown tints which are very fast.

What I claim is:—

1. A manufacture of new dyestuffs of the dibenzanthrone series containing chlorine, consisting in causing formaldehyde to act upon such compounds of the dibenzanthrone series which contain at least one $x$-H group, $x$ being O or NH, in presence of chlorosulfonic acid.

2. A manufacture of a new dyestuff of the dibenzanthrone series containing chlorine, consisting in causing formaldehyde to act upon the dihydroxydibenzanthrone of the formula

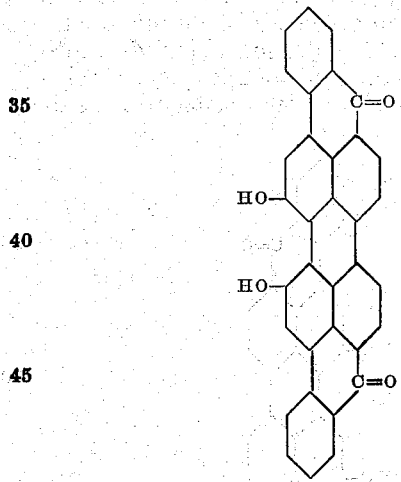

in presence of chlorosulfonic acid.

3. A manufacture of a new dyestuff of the dibenzanthrone series containing chlorine, consisting in causing formaldehyde to act upon aminodibenzanthrone, which is obtained by mononitrating and reducing dibenzanthrone, in presence of chlorosulfonic acid.

4. As new products the dyestuffs of the dibenzanthrone series containing chlorine, obtained by causing formaldehyde to act upon such compounds of the dibenzanthrone series which contain at least one $x$-H group, $x$ being O or NH, in presence of chlorosulfonic acid, which products dissolve in sulfuric acid to red-violet to blue solutions, yield with an alkaline hydrosulfite solution red-blue to blue vats, and dye cotton blue, grey to red-brown tints.

5. As a new product the dyestuff of the dibenzanthrone series containing chlorine, obtained by causing formaldehyde to act upon the dihydroxydibenzanthrone of the formula

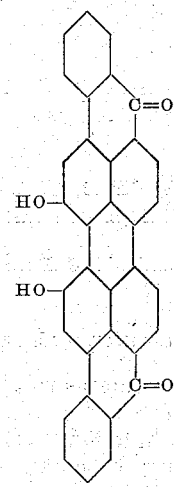

in presence of chlorosulfonic acid, which product dissolves in sulfuric acid to a red-violet solution, yields with an alkaline sodium hydrosulfite solution a red-blue vat, and dyes cotton blue tints.

6. As a new product the dyestuffs of the dibenzanthrone series containing chlorine, obtained by causing formaldehyde to act upon aminodibenzanthrone, which is obtained by mononitrating and reducing dibenzanthrone, in presence of chlorosulfonic acid, which product dissolves in sulfonic acid to a blue solution, yields with an alkaline sodium hydrosulfite solution a blue vat, and dyes cotton red-brown tints.

In witness whereof I have hereunto signed my name this 30th day of September 1931.

KARL KRAUER.